United States Patent Office 3,276,343
Patented Oct. 4, 1966

3,276,343
PHOTOGRAPHIC SHUTTER HOUSING
Ewald Spiessl, Deisenhofen, near Munich, Germany, assignor to Compur-Werk Gesellschaft mit beschränkter Haftung & Co., Munich, Germany, a firm of Germany
Filed June 9, 1964, Ser. No. 373,777
Claims priority, application Germany, July 5, 1963, C 10,697
11 Claims. (Cl. 95—53)

This invention relates to a photographic shutter having a casing or housing and a front plate, and especially but not exclusively to a shutter of the so-called objective type or between-the-lens type having an annular casing and an annular front plate surrounding the central light aperture and the optical axis.

An object of the invention is the provision of a generally improved and more satisfactory shutter.

Another object is the provision of improved means for holding the front plate in place on the casing, in a very simple fashion and without requiring auxiliary fastening elements.

Still another object is the provision, in connection with such holding means, of means whereby the front plate may be easily removed when required.

A further object is the provision of a shutter in which the front plate is made of molded plastic material, and the provision of holding means especially suitable for a front plate made from such material.

Figure 1:
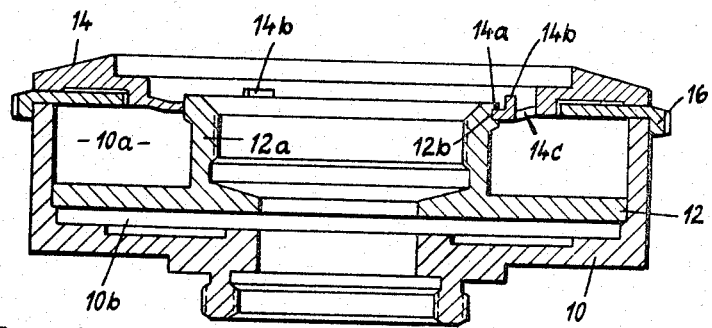
Figure 2:
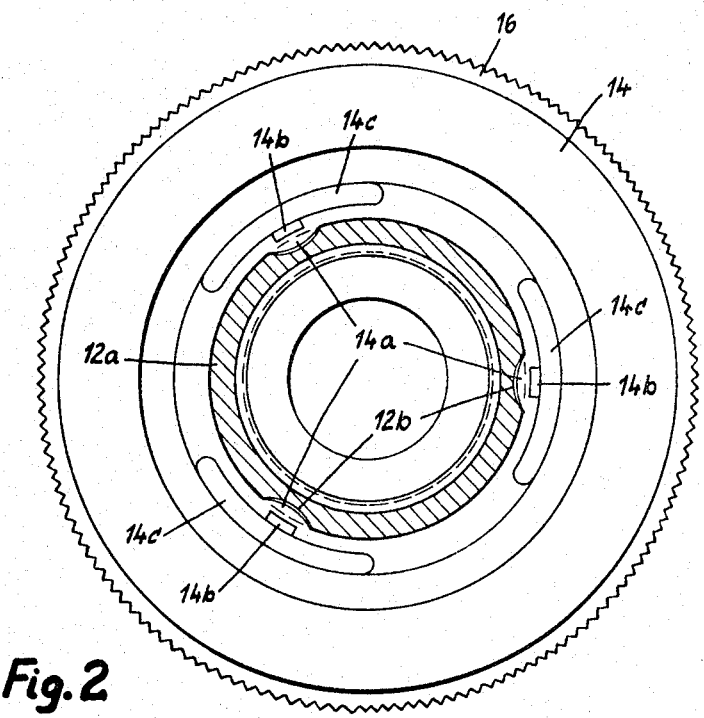

These and other desirable objects may be attained in the manner disclosed as an illustrative embodiment of the invention in the following description and in the accompanying drawings forming a part hereof, in which:

FIG. 1 is a diametrical section taken axially through a shutter in accordance with a preferred embodiment of the invention; and FIG. 2 is a front face view of the same, partly in transverse section.

As already indicated, the invention is applicable to shutter casings or housings of various different kinds and shapes. In the preferred embodiment of the invention as here illustrated, the shutter is of the objective or between-the-lens type, having a casing 10 of the annular shape customary in such shutters. Within the casing is the usual inner part 12 having a radial flange which constitutes a mounting plate for much of the shutter mechanism and having a forwardly extending annular tubular flange 12a which may constitute the front lens tube. If the front lens is movable axially for focusing, the front lens tube may be internally threaded as indicated in the drawing, and the usual front lens mount of conventional form may be screwed into the threads of the tube 12a, the mount being rotatable to produce axial focusing movement of the lens carried thereby.

The two casing parts 10 and 12 may be made of aluminum or other suitable material, preferably metal, and may be fastened to each other by screws or in any other conventional way. The driving and control parts of the shutter may be mounted as usual in the annular space 10a which surrounds the central light aperture. The space 10b may contain the shutter blades and also, if desired, the diaphragm leaves. The parts thus far described are all conventional and the details thereof are not important for purposes of the present invention, so may be varied widely.

According to the invention, the front end of the casing is closed by a front cover plate 14 of generally annular shape, made of material having a fair degree of springiness or resilience. For example, the cover plate may be made of sheet steel. Preferably, however, the cover plate is made by injection molding from a synthetic thermoplastic material having the required springiness, an excellent material for this purpose being acetal resin. When the plate is molded from synthetic plastic, it has the additional advantage (as compared with metal) that no finishing work is required on the cover plate, thus further reducing the cost of manufacture.

This cover plate 14 is provided at its inner diameter with a plurality of projections 14a which extend radially inwardly toward the center or optical axis, and which engage in undercut recesses 12b formed in the outside diameter of the front lens tube 12a. The recesses may be in the form of individual grooves, one for each of the projections 14a, or in the form of a single continuous groove extending circumferentially around the lens tube.

Because of the engagement of the projections 14a in the recesses 12b, the cover plate 14 is held securely on the front of the shutter, against dislodgment in an axial direction. This provides a trouble-free and positive connection.

In the immediate vicinity of each projection 14a, the cover plate is preferably provided with a projection or nose 14b which extends forwardly, in a direction parallel to the optical axis. Moreover, there is an arcuate slot 14c formed in the plate 14 opposite each projection 14a, the slot being spaced slightly outwardly from the projection 14a in a radial direction and extending circumferentially in both directions from the projection 14a, to a material extent as shown in FIG. 2. This slot increases the resilience in a radial direction of the material in the immediate vicinity of each projection 14a.

In assembling the shutter, the cover plate 14 is mounted on the front lens tube 12a by engaging the forwardly extending projections 14b with a suitable tool which will apply pressure to these projections in a radially outward direction, away from the center, while at the same time pressing the projections 14b axially rearwardly toward the back of the shutter. The radially outward pressure will spring the narrow webs or strips of material on which the projections 14a are formed, likewise in a radially outward direction, until the internal diameter of the cover plate, inside the projections 14a, is expanded enough so that the cover plate can be slipped over the front end of the lens tube 12a and be moved axially rearwardly thereon. The projections 14a will then snap into and be retained in the grooves or recesses 12b, if the radially outward pressure on the projections 14b is relieved at or shortly before the time that the projections 14a move into alinement with the recesses. The cover plate can be removed from the shutter in similar fashion, applying outward radial pressure to the projections 14b to spring the projections 14a radially outwardly from the retaining recesses 12b.

The outer edges of the cover plate may rest directly on the front edges of the casing 10 if no setting ring is to be used at this point, or may reset on the front surface of a shutter setting ring 16 (e.g., a shutter speed setting ring) which is interposed between the cover plate and the front edge of the casing. In either event, the location of the recesses 12b in an axial direction is preferably such that when the parts are assembled, the narrow webs which carry the projections 14a are somewhat stressed or flexed in a rearward direction, thereby holding the outer edges of the cover plate firmly and resiliently against the casing 10 or the setting ring 16, as the case may be.

This construction for fastening the cover plate 14 in place has the advantage that it is not necessary to use any auxiliary fastening elements, such as screws or retaining rings. This means a very simple and economical construction and a small assembly cost. The front lens tube 12a can be made slightly shorter than in the conventional construction, because it is not necessary to provide the extra length of tube which would be needed if the tube had a circumferential groove in front of the cover plate, for engaging a holding or retaining ring in front of the plate.

In the final assembled construction there is, of course, a further rotatable setting ring of any known kind (e.g., a lens focusing ring) mounted in front of the cover plate 14 in the shouldered recess or rabbet thereof. This front ring covers and hides both the projections 14b and the slots 14c of the cover plate 14.

Preferably there are three of the retaining projections 14a, equally spaced from each other in a circumferential direction. However, a greater or lesser number may be used, if desired.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic shutter housing of generally annular form having a central light aperture through which the optical axis passes, and a plate of generally annular form surrounding said light aperture, characterized by the fact that the plate has at least one radial projection which is resilient in a radial direction with respect to the light aperture and the housing has at least one radial recess for receiving the radial projection, the projection being adapted to engage in the correpsonding recess in a positive manner at least in an axial direction, for anchoring the plate to the housing against displacement in an axial direction, said projection being sufficiently resilient in a radial direction so that it may be sprung radially far enough to release it from the radial recess in which it is normally received.

2. A construction as defined in claim 1, further characterized by the fact that the plate has an axially extending nose associated with each radial projection and placed in such position that the radial projection may be moved in a radial direction by applying radial force to the associated axially extending nose.

3. A construction as defined in claim 2, further characterized by the fact that each radial projection on the plate is formed on a section separated from the main portion of the plate by a circumferentially extending slot, to increase the resilient flexibility of the section on which the projection is formed, both in a radial direction and in an axial direction.

4. A construction as defined in claim 3, further characterized by the fact that said plate is formed of an injection molding of synthetic thermoplastic material.

5. A construction as defined in claim 4, further characterized by the fact that the thermoplastic material is acetal resin.

6. A construction as defined in claim 1, further characterized by the fact that said plate is formed of an injection molding of synthetic thermoplastic material.

7. A construction as defined in claim 6, further characterized by the fact that the thermoplastic material is acetal resin.

8. A photographic shutter housing of generally annular form having an outer annular wall and an inner annular wall constituting a front lens tube, and a cover plate of generally annular form surrounding the lens tube and extending outwardly therefrom to cover the annular space between the lens tube and the outer wall of the housing, characterized by the fact that the plate has at its inner periphery three radially inwardly extending projections uniformly spaced from each other in a circumferential direction and formed on respective sections of the cover plate which are resilient in a radial direction, and three recesses formed in the periphery of said lens tube for receiving said projections to hold said cover plate against axial removal from said lens tube, said sections being sufficiently resilient in a radial direction so that said projections may be sprung radially outwardly relative to said lens tube far enough to release said projections from said recesses in which they are normally received, so that said plate may then be moved axially relative to said lens tube.

9. A construction as defined in claim 8, further characterized by the fact that each radial projection on the cover plate is formed on a section thereof which is separated from the main portion of the plate by a circumferentially extending slot, to increase the resilient flexibility of the section on which the projection is formed, both in a radial direction and in an axial direction, and the fact that each said section is flexed axially rearwardly when its radial projection is received in its corresponding recess, to tend to draw the main portion of the cover plate rearwardly to keep it snugly engaged with other parts of the shutter.

10. A construction as defined in claim 9, further characterized by the fact that said plate is formed of synthetic thermoplastic material.

11. A construction as defined in claim 10, further characterized by the fact that the thermoplastic material is acetal resin.

References Cited by the Examiner
UNITED STATES PATENTS 3,162,110   12/1964   Miessen _____ 95—44

JOHN M. HORAN, *Primary Examiner.*